United States Patent [19]

Baker et al.

[11] Patent Number: 5,309,971
[45] Date of Patent: May 10, 1994

[54] TIRE FLIPPER STRUCTURE

[75] Inventors: William C. Baker; Damon L. Christenbury, both of Greenville, S.C.

[73] Assignee: Michelin Recherche et Technique S.A., Granges-Paccot, Switzerland

[21] Appl. No.: 897,727

[22] Filed: Jun. 12, 1992

[51] Int. Cl.$^5$ .............................................. B60C 15/06
[52] U.S. Cl. .................................... 152/541; 152/542; 152/547
[58] Field of Search ............... 152/539, 541, 542, 543, 152/547

[56] References Cited

U.S. PATENT DOCUMENTS

| | | | |
|---|---|---|---|
| 2,493,614 | 1/1953 | Bourdon | 152/356 |
| 3,253,639 | 5/1966 | Travers | 153/362 |
| 3,638,705 | 2/1972 | Devienne et al. | 152/543 |
| 4,024,901 | 5/1977 | Poque | 152/354 |
| 4,067,373 | 1/1978 | Delobelle et al. | 152/547 |
| 4,295,512 | 10/1981 | Kawaguchi et al. | 152/547 |
| 4,462,448 | 7/1984 | Kawaguchi et al. | 152/543 |
| 4,711,285 | 12/1987 | Ogawa | 152/458 |
| 4,824,899 | 4/1989 | Yasuda | 152/541 |
| 4,850,412 | 7/1989 | Gupta | 152/556 |
| 5,023,292 | 6/1991 | Hong et al. | 152/547 |
| 5,033,524 | 7/1991 | Ohtsuka | 152/542 |
| 5,221,385 | 6/1993 | Hanada et al. | 152/547 |

FOREIGN PATENT DOCUMENTS

| | | | |
|---|---|---|---|
| 1594780 | 6/1970 | France . | |
| 2131804 | 6/1987 | Japan | 152/542 |
| 3050004 | 3/1991 | Japan | 152/542 |
| 3054007 | 3/1991 | Japan | 152/539 |

OTHER PUBLICATIONS

Dupont Brochure "Hyten Polyamide Monofilament".

Primary Examiner—Michael W. Ball
Assistant Examiner—Nancy T. Krawczyk
Attorney, Agent, or Firm—Robert Reed; Alan Csontos

[57] ABSTRACT

A tire includes a pair of axially spaced apart beads. A carcass ply extends between and is secured at axially opposite end portions to a respective one of the beads. A pair of bead fillers is also included. Each of the bead fillers is located radially outward of a respective bead. A flipper partially envelopes the bead and further engages and replaces a part of the bead filler. The flipper further includes a plurality of parallel extending reinforcing members. The flipper has a central portion located radially inward of the bead and a pair of leg portions. Each of the pair of leg portions extends radially outwardly from a bead reference. The radial extent of the leg portions is greater than a flange distance, being the radial extent of a flange of a rim, but less than the radial extent of an apex of the bead filler when the tire is properly mounted on the rim. The carcass ply turnup extends radially to approximately the height of the rim flange. Each flipper reinforcing member is made from a polyamide monofilament or a polymeric multifilament, preferably a multifilament.

13 Claims, 5 Drawing Sheets

TIRE FLIPPER STRUCTURE

BACKGROUND OF THE INVENTION

1. Technical Field

The present invention relates generally to a pneumatic vehicle tire. In particular, the present invention relates to an improved flipper structure in the bead area of the tire.

2. Description of the Prior Art

A pneumatic vehicle tire typically includes a pair of axially spaced apart beads. Each bead is substantially inextensible in the circumferential and diametral directions. A bead filler extends radially outwardly from a respective bead. At least one carcass ply extends between the beads. The carcass ply has axially opposite end portions, each of which is turned up around a respective bead and secured thereto. Tread rubber and sidewall rubber is located outwardly of the carcass ply. If the tire is a radial type of pneumatic tire, a belt package is provided and located between the carcass ply and the tread of the tire.

It is known that the automotive industry continually seeks to improve the fuel economy of each vehicle manufactured. In fact, many national governments throughout the world either have or are proposing mandated minimum fuel economy standards. In the United States of America, for example, minimum standards for corporate average fuel economy are constantly increasing. One way that the vehicle manufacturers increase their respective corporate average fuel economy is to reduce the overall resistance of the vehicle to movement.

A portion of the energy to move a vehicle is used to overcome the resistance of the tire to rolling at recommended operating conditions. It is known that approximately one third of a percent reduction in fuel economy is realized in a one percent reduction in rolling resistance for passenger car tires. The rolling resistance of a tire can be decreased by improved tire designs and by making vehicle operational changes. For example, a higher inflation pressure is an operational change that can decrease the rolling resistance of the tire. A design change may be the introduction of new materials having a low hysteresis property. One area of the tire that contributes a substantial amount to the rolling resistance of the tire is the bead area. Structural design changes in the bead area can improve rolling resistance of the tire by reducing stress and strain in the bead area. However, structural changes in the bead area of the tire which reduce the stresses and strains (often through increases in the rigidity of the bead structure) typically tend to decrease ride comfort characteristics. Structural changes in the bead area of the tire have included a variety of approaches.

For example, U.S. Pat. No. 4,711,285 discloses a bead filler having an anisotropic elasticity. The anisotropic elasticity is accomplished by incorporating short fibers of a thermoplastic material into the rubber composition of the bead filler. The short fibers are oriented in the longitudinal direction during an extrusion operation used to produce the bead filler. When the bead filler is formed radially outward of the bead, the short fibers become oriented in a circumferential direction of the assembled tire.

It is known to provide a flipper surrounding the bead and bead filler made from a square woven cloth. The cloth is typically made of a textile material in which each fiber (thread) has a generally round cross-section. When this known flipper is cured in the tire, the stiffness of the filaments are essentially the same when taken in any direction.

Examples of other flippers are found in U.S. Pat. Nos. 2,493,614 and 3,253,639 which disclose disadvantages associated with the flippers. In U.S. Pat. No. 2,493,614 the ride comfort of a tire is decreased by limiting the "yieldingness" in the sidewalls of the tires. In U.S. Pat. No. 3,253,639 radial and circumferential deformations of the tire are disclosed. The deformations result in shearing stresses during normal operation of the tire. Circumferential deformations create relatively high shearing stresses between plies and within a ply in the areas of the tire where the flippers overlap the radial carcass ply cords. Limits on the radial turnup extent of the carcass ply cords around the beads are made to locate the ends of the ply where radial deformations of the tire are relatively small. The ends of carcass ply which are turned up around the beads generally do not extend beyond one third of the interior height of the tire measured from the bead to the interior surface of the tire at the crown.

Stresses that reduce energy losses in the bead assembly are frequently accompanied by strains that give less ride comfort. A balance between stresses and strains in the tire is desirable. A balanced design for a reinforced bead assembly of a tire has stress characteristics for increased endurance and reduced energy loss and strain characteristics for adequate ride comfort. Thus, there is a need for a new tire which has decreased rolling resistance without increasing vehicle ride harshness.

An objective of this invention is to provide reinforcement of each bead assembly to help protect the beads from exterior damage and to provide a better balance between stress and strain characteristics in the bead area than prior art tires. The reinforcement shall be designed to have an improved hysteresis property. This objective is to improve the rolling resistance of the tire. Another objective of this invention is to limit the radial extent of the flipper, as well as the carcass ply turnup, to maintain optimum circumferential and radial stiffness properties of the tire. This objective is associated with maintaining vehicle ride comfort.

SUMMARY OF THE INVENTION

The present invention is directed to a radial pneumatic tire for use on a vehicle. The tire has an improved area of the bead which contributes to reduce rolling resistance of the tire without increasing vehicle ride harshness. The improved bead area is accomplished by providing a new bead assembly having a new flipper structure.

A tire embodying the present invention is for mounting on a vehicle rim. The tire includes a pair of axially spaced apart beads. A carcass ply extends between the beads and is secured at axially opposite end portions to a respective one of the beads. Each axial end portion of the carcass ply is turned up around the bead and extends to a radial position approximately equal to the radial extent of a flange of the rim when the tire is properly mounted on the rim. The tire has a pair of bead fillers with each bead filler located radially outwardly of a respective bead. Each bead filler tapers to an apex located radially outward of the radial extent of the flange of the rim when the tire is properly mounted on the rim. A flipper having a plurality of substantially parallel extending flipper reinforcing members partially envelopes a respective bead and bead filler. The flipper has a central portion in contact with the respective bead and a pair of leg portions extending from the central portion and engaging the bead filler. Each of the pair of leg portions extends radially outwardly to a location between the radial extent of the flange of the rim and the apex of the bead filler when the tire is properly mounted on the rim.

The flipper enhances load transmission between the tire and the rim during vehicle operation. The flipper reinforcing members may be made from a polyamide monofilament material or a polymeric multifilament material. The width of the monofilament flipper reinforcing members in the circumferential direction is preferably at least twice the thickness of the flipper reinforcing members in an axial direction. Monofilament flipper reinforcing members have a mass to length ratio in the range of 2000 denier to 6000 denier.

Flipper reinforcing members are spaced apart a distance in the range of about nine to about twenty-five flipper reinforcing members per inch in a direction transverse to the longitudinal extent of the flipper reinforcing members. Flipper reinforcing members are bonded together by skim rubber sheets to make the rubberized ply. This rubberized ply has a thickness in the range of 0.64 millimeters to 1.15 millimeters. The rubberized ply has a modulus of elasticity in a direction parallel to the longitudinal extent of the flipper reinforcing members of at least 100 megaPascals (MPa) at an elongation resulting from a strain of ten percent.

Each of the flipper reinforcing members is disposed at an angle relative to a radial plane of the tire in the range of 30 degrees to 60 degrees. The flipper reinforcing members in a leg portion located on one axial side of the bead extend in an opposite direction relative to a radial plane of the tire than the flipper reinforcing members located in another leg portion of the other axial side of the bead. The flipper is located between the carcass ply and the bead.

The axially innermost leg portion of the flipper extends radially outwardly from a bead reference a distance at least 10 percent less than the extent of the apex. The axially outermost leg portion of the flipper extends a radial distance from the bead reference a distance which is at least equal to the radial extent of the flange of the rim when the tire is properly mounted on the rim.

According to another embodiment of the present invention, a radial tire comprises a pair of axially spaced apart beads with a carcass ply extending between the beads. The carcass ply is secured at axially opposite end portions to a respective one of the beads. Each one of a pair of bead fillers is located radially outward of a respective bead. Each of the bead fillers tapers radially outward to an apex. The improvement to the tire comprises a pair of flippers having a first hysteretic property. Each flipper replaces a predetermined portion of a respective one of the fillers having a second hysteretic property. Each flipper has a central portion partially enveloping a respective bead and a pair of leg portions engaging a respective filler. The leg portions extend radially outward from said bead reference to a location radially inward of the apex. The first hysteretic property of the flippers is less than the second hysteretic property of the fillers. The replacing of a predetermined portion of each bead filler enables the reduction of rolling resistance of the tire by at least 2.6 percent without decreasing the vehicle ride comfort of the tire.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
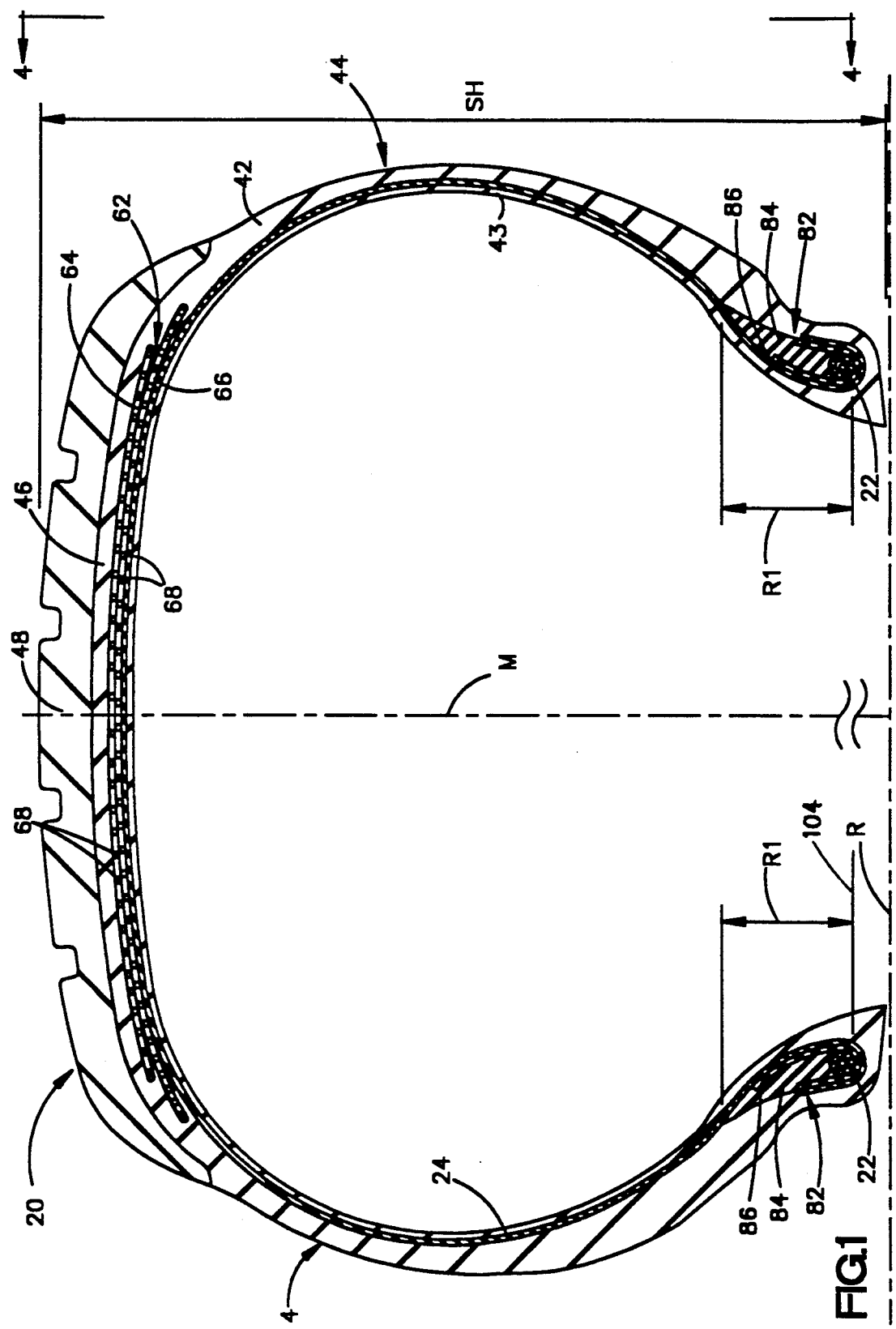
FIG. 1 is a cross sectional view of a tire having two flippers embodying the present invention.

A tire 20 embodying the present invention is illustrated in FIG. 1. The tire is suitable for mounting on a rim of a vehicle such as a passenger car, light truck or the like. The tire 20 is properly mounted on the rim 100 when the tire 20 is in contact with the rim 100 and the tire 20 is inflated to a predetermined inflation pressure. The inflation pressure is specified for each tire size and application by the standards of the Tire and Rim Association (T&RA) of Copley, Ohio. The rim 100 shape and size is also specified by T&RA for different sizes of the tire 20. The tire 20 is rotatable about an axis R.

The tire 20 includes a pair of beads 22 which are spaced apart axially along the axis R. Each of the beads 22 includes a wire, or a ribbon with several wires, wrapped to form an annular ring. Each of the beads 22 is substantially inextensible in the circumferential and diametral directions. The circumferential direction is defined as being parallel to the midcircumferential plane M of the tire 20 and normal to the rotational axis R (FIG. 1). The bead wire is preferably made from a suitable material, such as a steel alloy.

The tire 20 includes at least one carcass ply 24. The carcass ply 24 extends between the beads 22. The carcass ply 24 includes a pair of axially opposite end portions 26 (FIG. 2), each of which is secured to a respective one of the beads 22. The axial end portions 26 of the carcass ply 24 are turned up and around the respective bead 22 to a position sufficient to "anchor" each axial end portion 26.

The carcass ply 24 is preferably a "radial" carcass ply. The carcass ply 24 is a rubberized ply having a plurality of substantially parallel extending carcass reinforcing members. The carcass reinforcing members are preferably made of a multifilament material, such as a plurality of twisted polyester filaments. As used herein, the term "radial" is intended to mean that the reinforcing members of the carcass ply 24 extend substantially parallel to a radial plane P (FIGS. 3 and 4) extending from the axis R. The term "radial" is also intended to mean that the each reinforcing member of the carcass ply 24 does not deviate from the radial plane P by an angle of more than about 20 degrees when the tire is unloaded or loaded.

Figure 2:
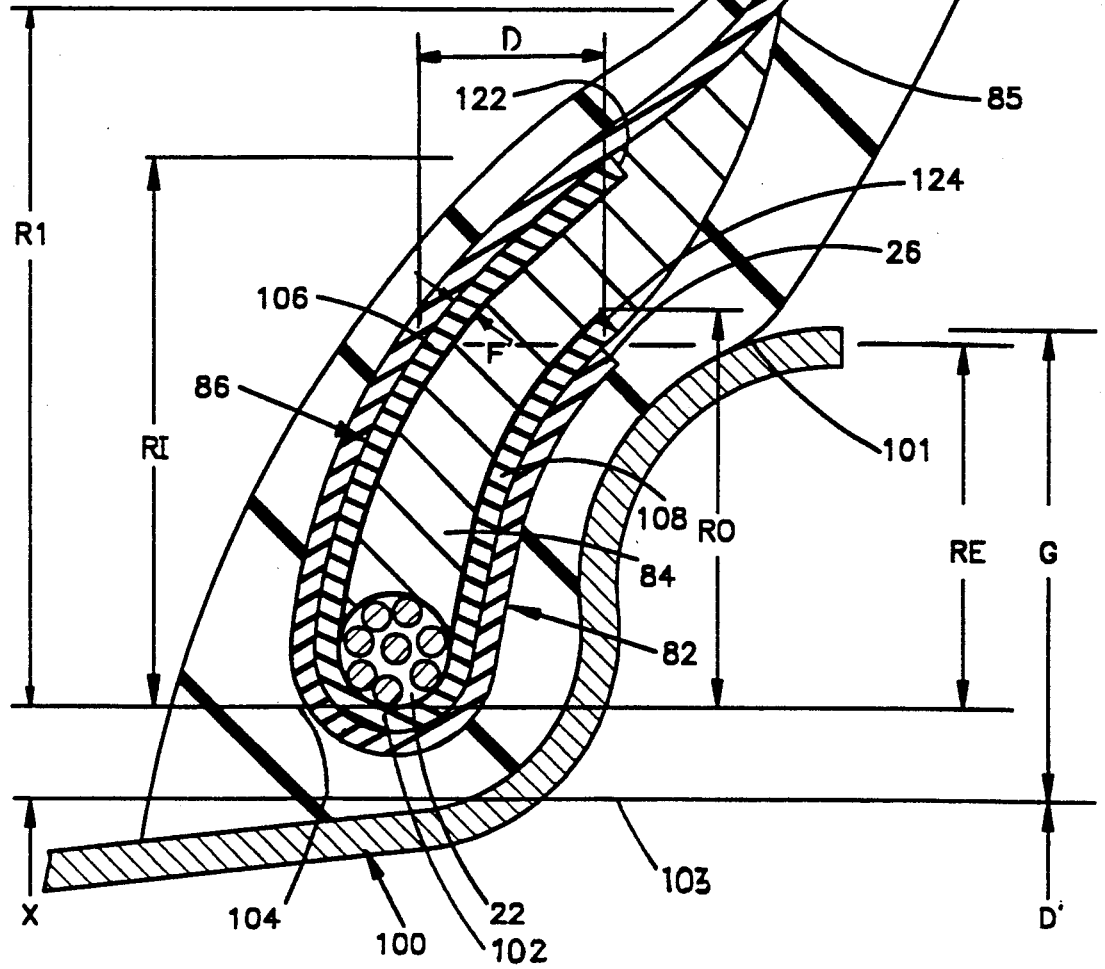
FIG. 2 is an enlarged cross sectional view of a portion of the tire in FIG. 1 mounted on a portion of a rim.

The carcass ply 24 engages the axial outer surfaces of a flipper 86 (FIG. 2). The axial end portion 26 of a turned up portion of the carcass ply 24 is located radially outwardly to an extent RE from a bead reference 104. The bead reference 104 is a line defining a radial location to be used to locate the relative radial position of various components (carcass end portion, flipper ends and filler apex) within the bead assembly 82 of the tire 20. The bead reference 104 is a reference line parallel to the rotational axis R at the inner periphery of the bead 22. The radially outermost extent RE of the axial end portion 26 is approximately equal to a flange distance G-X. The flange distance G-X is defined as the radially outward distance of the flange 101 of the rim 100 from the bead reference 104 when the tire is properly mounted on the rim. The flange distance equals the flange height G measured radially from a rim reference 103 less the radial distance X to the bead reference 104 from the rim reference 103 when the tire 20 is properly mounted on the rim 100, or G-X. The rim reference 103 and flange height G is established for each rim 100 size and type by the standards of the Tire and Rim Association (T&RA) of Copley, Ohio. Radial and circumferential deformations of the tire 20 are relatively low near the rim flange 101 because of the support provided to the tire 20 by the rim flange 101. Therefore, shearing stresses between carcass ply 24 and flipper 86, and within the carcass ply 24 and the flipper 86, are maintained at a low magnitude.

The tire 20 includes rubber material 42 (FIG. 1) located axially outward of the carcass ply 24 in the sidewalls 44 of the tire. The tire 20 also includes a relatively air impermeable innerliner rubber 43 located inward of the carcass ply 24. The tire 20 includes undertread rubber 46 and tread rubber 48 located radially outwardly of the carcass ply 24 in a crown portion of the tire. The rubber material 42, innerliner 43, undertread rubber 46 and tread rubber 48 may be of any natural rubber, synthetic rubber or any combination thereof which is suitable for the intended use of the tire 20. The rubbers 42, 43, 46, 48 are bonded to the carcass ply 24 and other tire components during a curing operation.

The tire 20 also includes a belt package 62 between the tread 48 and the carcass 24 in the crown of the tire. The belt package 62 includes a pair of annular belts 64, 66. The belt 64 is located radially outward of the belt 66. The belt 64 is preferably slightly narrower in the axial direction than belt 66. Each of the belts 64, 66 includes a plurality of substantially parallel extending belt reinforcing members 68. Each of the belt reinforcing members 68 are preferably made of a suitable material, such as a steel alloy.

The tire 20 further includes a pair of bead assemblies 82. Each of the bead assemblies 82 includes the bead 22 and a bead filler 84. The bead filler 84 is located radially outwardly of the respective bead 22. The bead filler 84 extends for a radial distance R1 outwardly of the bead reference 104 and tapers to an apex 85. The bead filler 84 has a concave radially innermost surface in contact with the radially outer periphery of the bead 22. The bead filler 84 is made from a rubber material which is relatively stiffer and has hysteresis properties relatively higher than the rubber in other portions of the tire 20. Hysteresis is the dependence of the state of a system on its previous history, generally in the form of a lagging of a physical effect behind its cause. In the tire 20 the physical strain is caused by the stress and strain lags behind the stress. Hysteresis loss is the energy converted to heat in a material because of hysteresis. Less energy is converted to heat when the lag of strain behind the stress is reduced.

A flipper 86 according to one embodiment of the present invention is illustrated in FIG. 2. The flipper 86 is a rubberized ply including a plurality of parallel extending flipper reinforcing members 87,88 having a relatively thin amount of rubber skim material adhered to the flipper reinforcing. The flipper 86 partially surrounds or partially envelopes the bead 22 and engages the bead filler 84 on both of the axial sides of the bead filler to complete the bead assembly 82. The flipper 86 is located between the carcass ply 24 and a respective one of the beads 22 and the bead filler 84. The axial distance D between the carcass ply 24 and the turnup portion of the carcass ply 24, at a radial distance RE equal to the radial extent of the axial end portion 26 from the bead reference 104, is predetermined. Therefore, a predetermined portion of a standard T&RA bead filler has been replaced by the flipper 86 of the present invention to give and improved tire 20.

The flipper 86 has a central portion 102 located radially inwardly of, and in contact with a portion of the bead 22 as shown in FIG. 2. A pair of leg portions 106,108 extend from respective axially opposite ends of the central portion 102 of the bead assembly 82. The leg portions 106 and 108 extend a predetermined distance radially outwardly of the bead reference 104. The axially outermost leg 108 portion extends a radial distance RO. The axially innermost leg portion 106 extends a radial distance RI. The radial distances RO and RI are defined as the radial distance from the bead reference 104 of the bead assembly 82 to the radially outermost location of the end 122,124 of the respective leg portions 106,108 of the flipper 86.

The radial distance RO of the axially outermost leg portion 108 is at least equal to the radial extent of the flange 101 of the rim 100 when the tire 20 is properly mounted on the rim 100. Preferably the distance RO is 2 millimeters greater than the radial extent of the flange 101 to allow for variations in the bead height X due to compression of rubber materials in the bead assembly 82. The flange height G according to T&RA standards is 14.4±0.8 millimeters for 12 and 13 inch tires (dimension D) and 17.8±0.9 millimeters for 14, 15, 16 and 17 inch tires (dimension D) from the rim reference 103 for a type J or B rim 100. The nominal bead height X measured radially from the rim reference 103 to the bead reference 104 is in a range of 2 millimeters to 4 millimeters.

The radial distance RI of the innermost leg portion 106 is preferably 5 millimeters greater than the radial distance RO of the outermost leg portion 108. The radial distance RI of the innermost leg portion 106 is less than the radial distance R1 to the apex 85 of the bead filler 84 by at least 10 percent, and preferably by at least 20 percent. Therefore, ends 122,124 of each respective leg portion 106,108 are located radially inward of the extent defined by the distance R1 of the apex 85 of the bead filler 84.

Figure 3:
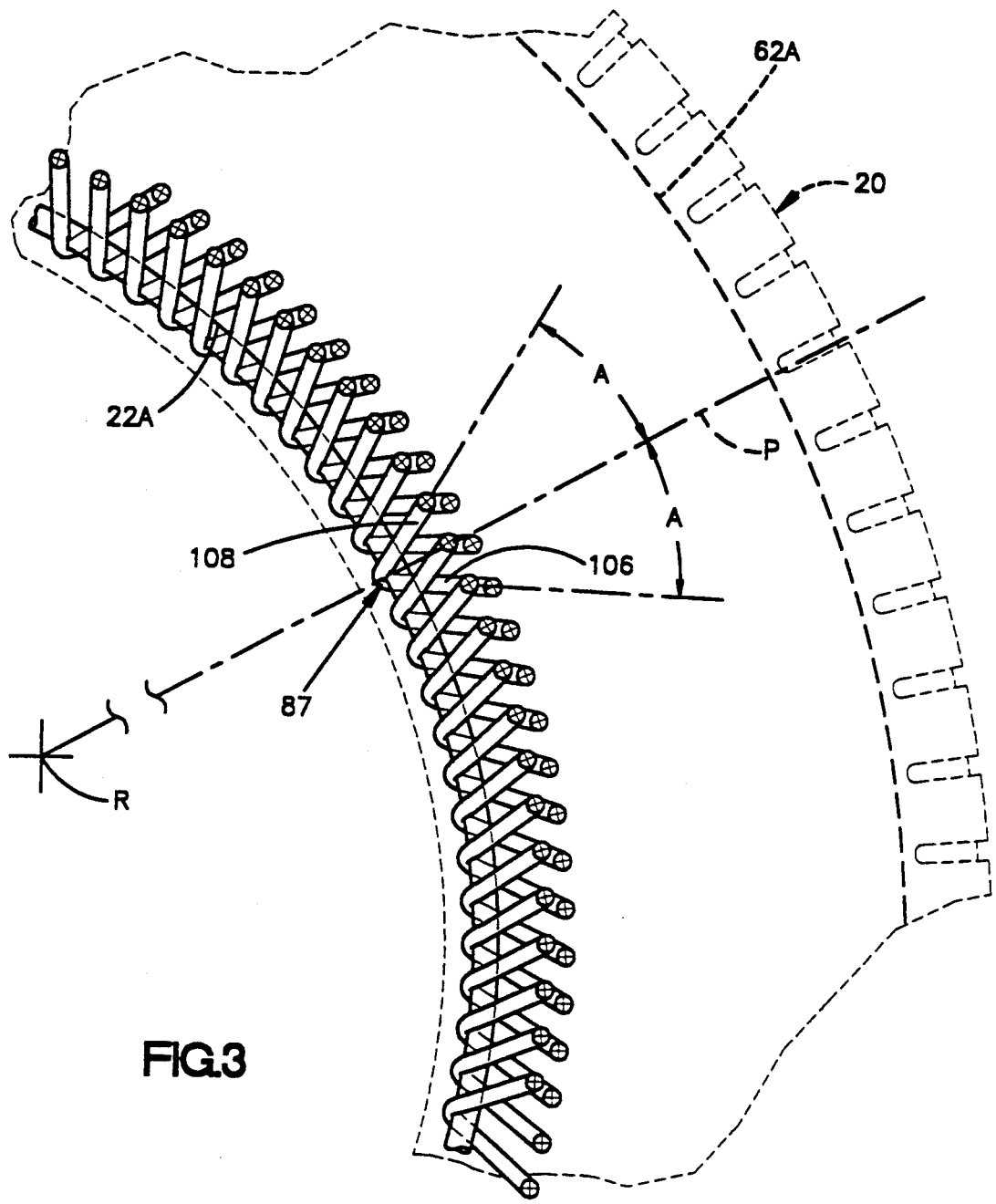
FIG. 3 is a phantom side view of the bead area of a portion of one embodiment of the tire, illustrating multifilament flipper reinforcing members.
Figure 4:
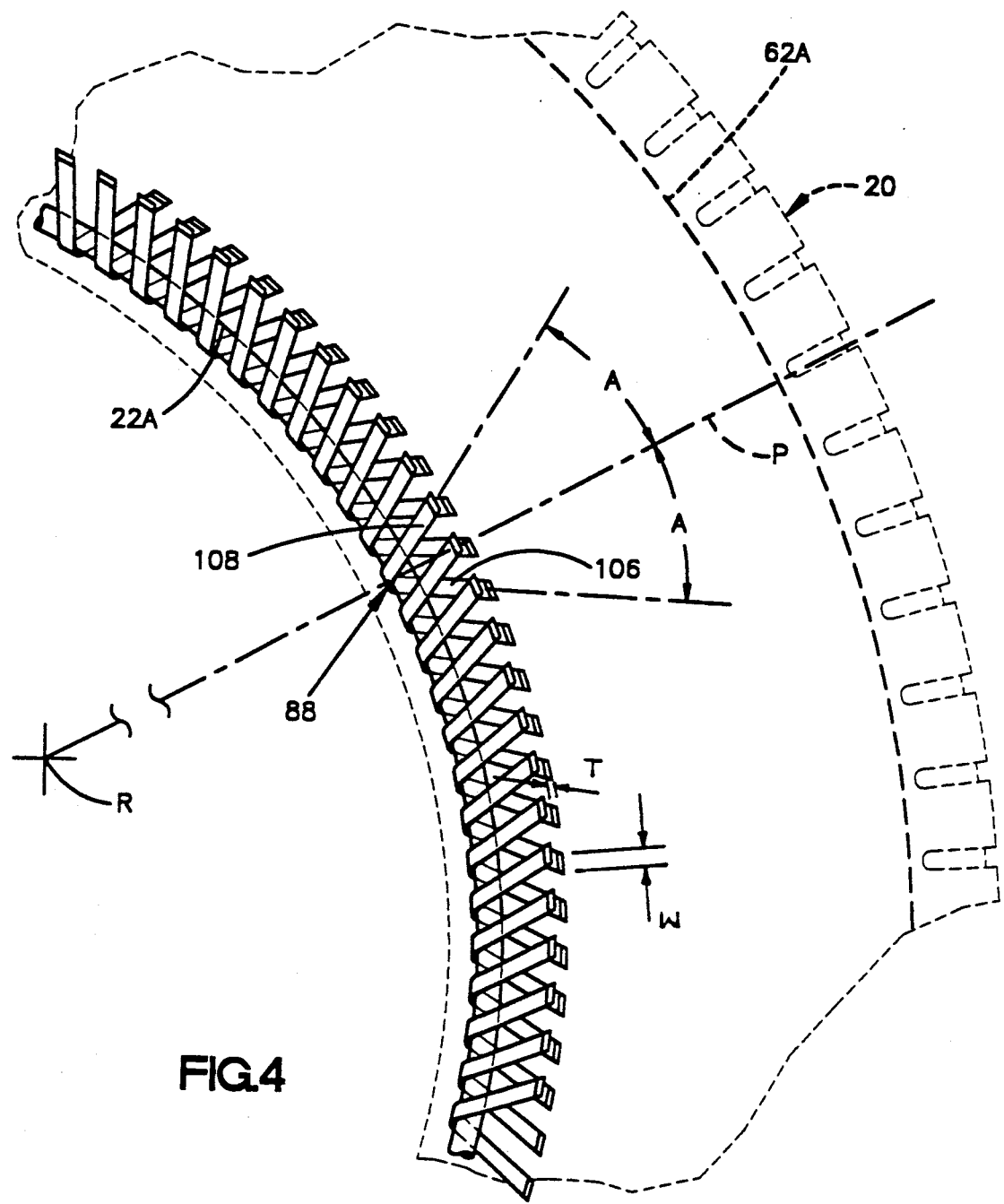
FIG. 4 is a phantom side view of the bead area of a portion of another embodiment of the tire, illustrating monofilament flipper reinforcing members.

As illustrated in FIGS. 3 and 4, each of the flipper reinforcing members 87,88 are turned about the bead 22 so that a respective leg portion 106,108 is located in the tire 20 at a predetermined angle A relative to the radial plane P of the tire. The predetermined angle A is in a range of 30 degrees to 60 degrees relative to the radial plane P, and is preferably 45 degrees. The flipper leg portion 106 of the reinforcing members 87,88 located on the axial innermost side of the bead filler 84 extend in an opposite direction relative to the radial plane P than the portion 108 of the flipper reinforcing members 87,88 on the axial outermost side of the bead filler.

Each flipper reinforcing member 87,88 is made from a polyamide monofilament or a polymeric multifilament. The use of monofilament flipper reinforcing members 88 is illustrated in FIG. 4 and the use of multifilament flipper reinforcing members 87 is illustrated in FIG. 3. The monofilament reinforcing member 88 has an "obround" cross section with its largest dimension defined as a width W taken in a circumferential direction of the tire 20, as viewed in FIG. 4. When the flipper 86 is cured into the tire 20, each individual monofilament flipper reinforcing member 88 has a stiffness taken in a circumferential direction which is greater than a stiffness taken in an axial direction. A flipper 86 having multifilament reinforcing members 87 is preferred for economic and ease of manufacture considerations.

The monofilament flipper reinforcing member 88 also has a thickness T taken in an axial direction parallel to the rotational axis R. The width W is greater than the thickness T. Preferably, the width W is at least twice the thickness T. Each of the monofilament flipper reinforcing members 88 has a mass to length ratio in the range of 2000 denier to 6000 denier, preferably equal to 4440 denier.

Figure 5:
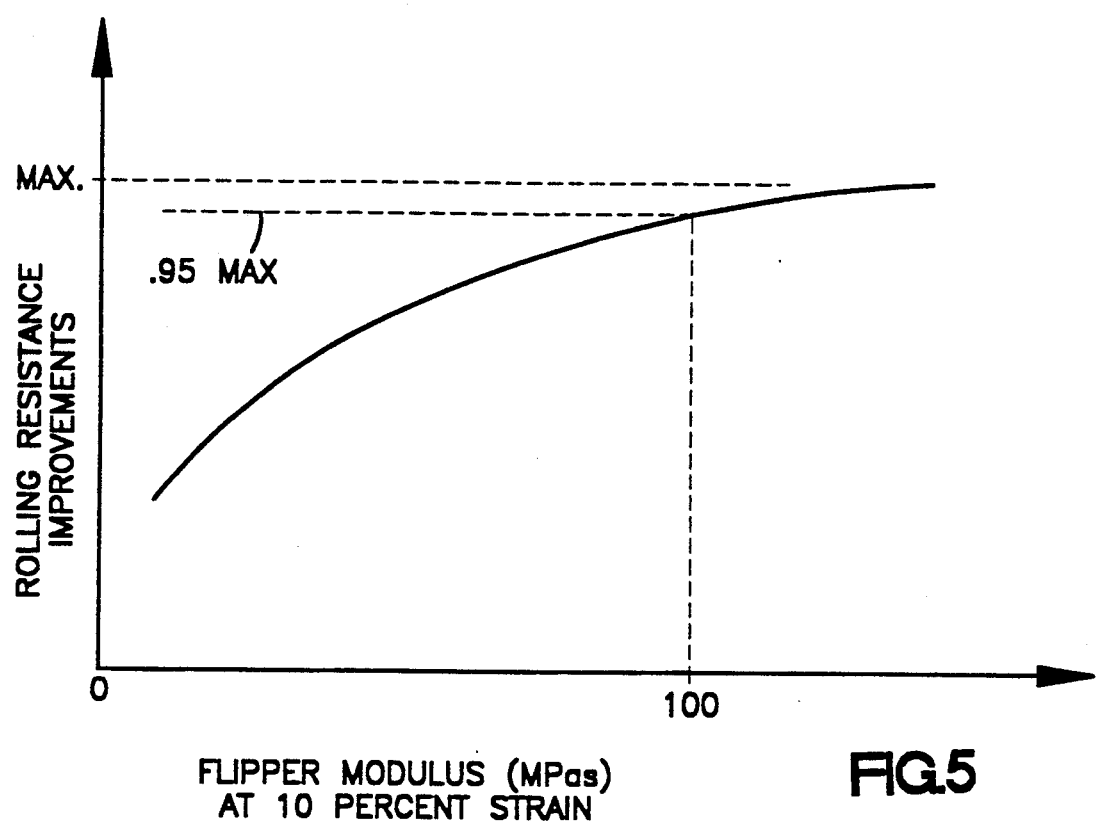
FIG. 5 is a graph of the rolling resistance improvements as a function of the flipper modulus of elasticity.

A relationship between the modulus of elasticity of the flipper 86 and the rolling resistance improvements has been discovered during testing of the tire 20. The modulus of elasticity of the flipper 86 is the slope of the stress-strain curve of the flipper including the rubber matrix and the flipper reinforcing members 87,88. The modulus of elasticity is measured in a direction parallel to a longitudinal axis of the flipper reinforcing members 87,88 at an elongation resulting from ten percent strain. The improvement in rolling resistance as a function of flipper modulus is illustrated graphically in FIG. 5.

At a modulus of elasticity of 100 megaPascals (14,500 psi) for the flipper 86 the improvement in rolling resistance reaches 95 percent of a maximum value that would occur with no limit on the modulus of elasticity above 100 megaPascals. This relatively low modulus of elasticity allows the use of a polymeric multifilament, such as polyester, or a polyamide monofilament, such as a nylon available from DuPont under the name HY-TEN®, to be used as flipper reinforcement members 87,88.

The total thickness F (FIG. 2) of the rubberized ply of the flipper 86 is relatively small compared to prior art flippers. The thickness F of the rubberized ply of the flipper 86 is in the range of 0.64 millimeters to 1.15 millimeters, preferably equal to 0.72 millimeters. The thickness adds a relatively small thickness adjacent the bead 22 of the bead assembly 82, and provides a circumferential or torsional stiffness taken in a direction parallel to the midcircumferential plane M of the tire 20 which is approximately the same as the circumferential stiffness of a prior art tire having the same size and load rating, but without a flipper. The flipper 86 also provides additional stiffness to the lower bead area 82 of the tire 20 when the tire is not inflated. This gives some additional strength to the bead 22 during handling and storage of the tire 20.

Rolling resistance of the tire 20 is a function of the hysteretic properties of the materials in the tire. The greater the hysteresis the more the loaded, but free to rotate, tire 20 resists rolling about its rotational axis R. The bead filler 84 material has a relatively high hysteresis for stiffness in the bead area of the tire 20. As a consequence it has been empirically determined that the bead area of a prior art tire contributes approximately 20 percent of the total rolling resistance of the tire.

It is known that energy loss per cycle on a tension test sample of a linear viscoelastic material (rubber) can be represented by the equation:

$$\text{Energy Loss/Cycle} = \pi \sigma \epsilon \sin \delta$$

where $\delta$ is the phase angle resulting between the stress amplitude $\sigma$ and the strain amplitude $\epsilon$ component in a sinusoidally applied stress-strain cycle. Therefore, the larger the phase angle $\delta$ the larger the energy loss in one stress cycle.

The hysteretic property of the material is referred to in the art, and herein, as the tangent of the phase angle $\delta$ or $\tan \delta$. The rubber material of the bead filler 84 of the present invention has a $\tan \delta$ hysteretic property in a range of 0.30 to 0.35. The rubber material of the flipper 86 of this invention has a $\tan \delta$ hysteretic property in a range of 0.05 to 0.08. It should be apparent that the flipper 86 under the same stress and strain as the filler 84 would have less energy loss per cycle.

The pair of leg portions 106,108 of the flipper 86 engage and partially replace a predetermined portion of the filler 84. The flipper 86 of this invention replaces at least 15 percent of the filler 84 volume and preferably replaces 25 percent. Therefore, the bead assembly 82 of the present invention results in a reduction in average energy loss per cycle, which reduces the rolling resistance of the tire 20 by at least 2.6 percent. Stiffness of the bead area is maintained by the reinforcing members 87,88 in the flipper 86. However, limits on the radial extent of the leg portions 106,108 of the flipper 86 maintains radial stiffness and torsional stiffness of the tire 20. Thus a harsh ride is avoided.

The results of the replacement of rubber material in the filler 84 having a relatively high hysteresis material by a flipper 86 having a relatively low hysteresis material generally reduces the operating temperatures in the bead assembly 82. Reduced temperatures in the tire 20 are also indicative of reductions in rolling resistance.

The flipper 86 of this invention limits the radial extent of the leg portions 106, 108 so that radial and torsional stiffness increases are near zero. The forces and moments between the rim 100 and tire 20 are necessary to support the vehicle and to brake or accelerate the vehicle. Radial stiffness is the ratio of the total vertical force on the tire 20 to the vertical deflection of the rotational axis R of the tire 20. The torsional stiffness is the ratio of the moment on the tire 20 about the rotational axis R divided by the angular rotation of the tire 20 due to the moment. The standard T&RA tire with the addition of the flipper 86 of this invention provides a new tire 20 having a similar angular rotation and vertical deflection, with the same forces and moments, as the T&RA tire. The result is torsional and radial stiffnesses which are approximately unchanged. Therefore, a relatively unchanged ride comfort of the vehicle results after the addition of the flipper 86 to a standard T&RA specified tire.

An alternate embodiment includes a short fiber flipper having short fibers of textile or metallic material aligned in a specific direction in a rubber matrix to form a composite ply. The specific direction shall be similar to that disclosed for the monofilament or multifilament flipper reinforcing members with respect to the radial plane P. The short fiber flipper also has a modulus of elasticity of at least 100 MPa in the specific direction.

Experimental Evidence

Figure 6:
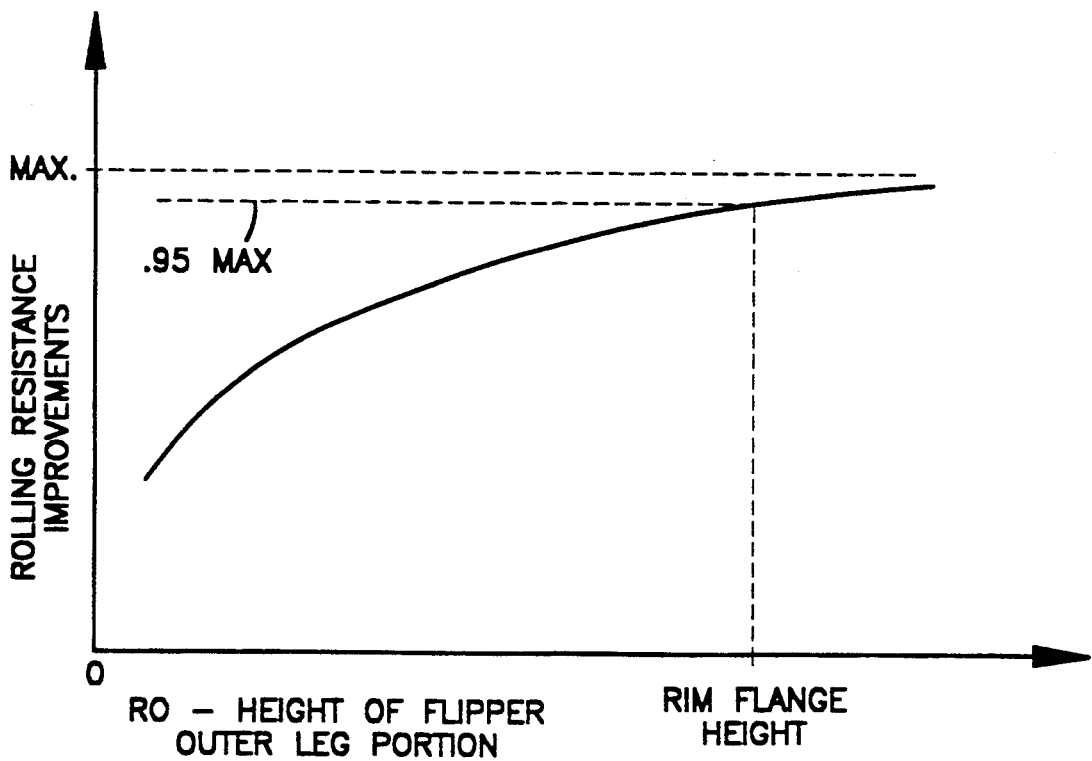
FIG. 6 is a graph of the rolling resistance improvements as a function of the radial extent of the axially outer leg of the flipper.

Improved rolling resistances of as much as 5.3 percent are observed in a tire 20 embodying the present invention as listed in the table below. A relationship between the radial distance RO the outer leg portion 108 extends from the bead reference 104 and rolling resistance improvement is plotted graphically in FIG. 6. At the distance RO equal to the radial extent of the flange 101 of the rim 100 an improvement of 95 percent of the maximum improvement theoretically possible is achieved.

Rolling resistance tests for tires 20 of various size are summarized in the following table. A standard test drum or roadwheel was used with an inflation pressure of 2.62 bars (38 psi), a load being 80 percent of the standard T&RA load rating and a test speed of 50 miles per hour. Tires with no flipper are compared with tires having the same structure except for addition of a flipper 86 embodying the present invention having a twisted multifilament polyester material for the flipper reinforcing members 87. Rolling resistance improvements from 2.6 percent to 5.3 percent were achieved. Rolling resistance values in the table are the tangential force to rotate the tire 20 divided by the load carried by the tire 20 times the constant 1000.

| DRUM ROLLING RESISTANCE FOR TIRES WITH OR WITHOUT A FLIPPER | | | |
|---|---|---|---|
| TIRE SIZE | STANDARD CONSTRUCTION | FLIPPER ADDED | % REDUCTION |
| P185/70R14 | 7.94 | 7.69 | 3.1 |
| P185/65R14 | 7.67 | 7.47 | 2.6 |
| P215/60R16 | 7.16 | 6.80 | 5.0 |
| P215/65R15 | 10.78 | 10.21 | 5.3 |
| P185/70R13 | 4.86 | 4.63 | 4.7 |
| | | AVG. | 4.2 |

Ride comfort passenger car tests were performed with identical tires except one set of tires on the same vehicle had the preferred flipper 86 embodying the present invention. Overall subjective ride comfort values were essentially not changed. These results were confirmed by static tests of a P185/70 R14 Michelin LX1 tire 20 that gave radial and torsional stiffnesses values for the tire 20 within 2 percent of radial and torsional stiffness values for an identical standard T&RA tire except for the flipper 86 in the bead assembly 82.

A cornering coefficient test was also conducted on the tire 20. Cornering coefficient improvements are known to enhance ride comfort. The cornering coefficient is defined as the ratio of a tangential lateral force on the tire 20 at the ground surface divided by the normal force on the tire 20 at the ground surface at a one degree slip angle. The slip angle is the angle between the mid-circumferential plane M of the tire 20 and the direction the tire 20 is traveling. An increase in the cornering coefficient of 2 percent was achieved for the tire 20 in comparison with the identical T&RA tire.

From the above description of preferred embodiments of the invention those skilled in the art will perceive improvements, changes and modifications. Such improvements, changes and modifications within the skill of the art are intended to be covered by the appended claims.

Having described preferred embodiments of the invention, what is claimed is:

1. An improved radial tire comprising a pair of axially spaced apart beads, a carcass ply extends between and is secured at axially opposite end portions to a respective one of said beads and a pair of bead filler, each of said pair of bead fillers is located radially outward of a respective bead which is located by a bead reference parallel to a rotational axis of the tire at the inner periphery of the bead and tapers to an apex, wherein the improvement comprises:

a pair of flippers with a first hysteretic property, each flipper replacing a predetermined portion of a respective one of said bead fillers having a second hysteretic property, each flipper having central portion partially enveloping a respective bead and a pair of leg portions engaging a respective bead filler, said leg portions extend radially outward from the bead reference to a location radially inward of said apex, said replacing of the predetermined portion being defined as specifying an axial distance between the carcass ply and a turnup portion of said carcass ply at a radial distance equal to the extent of an axial end portion of said turnup portion, said first hysteretic property being less than said second hysteretic property, whereas said replacing of the predetermined portion of said bead filler enables the reduction of rolling resistance of said tire by at least 2.6 percent without decreasing the vehicle ride comfort characteristics of said tire.

2. The tire set forth in claim 1 wherein the improvement is further characterized by said pair of leg portions replacing at least fifteen percent of the volume of said respective filler.

3. The tire set forth in claim 1 wherein said flipper is located between said carcass ply and the assembly comprising said bead and said bead filler.

4. The tire set forth in claim 1 wherein said leg portions extend to a location radially outward of the radial extent of a flange of the standard T&RA rim when the tire is properly mounted on the rim.

5. The tire set forth in claim 4 wherein said apex is located radially outward of said bead reference a distance at least 10 percent greater than the extent of an axially innermost leg portion of said flipper.

6. The tire set forth in claim 1 wherein an axially outermost leg portion of said flipper extends radially outward to a location at least equal to the radial extent of the flange of the rim when the tire is properly mounted on the rim, the location of said outermost leg portion being a distance at least 5 millimeters less than the radial extent of an axially innermost leg portion of said flipper.

7. The tire set forth in claim 1 wherein said flipper has substantially parallel reinforcing members made from a polyamide monofilament material, each one of said reinforcing members having a width extending in a circumferential direction at least twice the thickness of said flipper reinforcing member in an axial direction.

8. The tire set forth in claim 1 wherein said flipper has substantially parallel reinforcement members made from a polymeric multifilament material, each one of said reinforcing members having a circular cross section.

9. The tire set forth in claim 1 wherein said flipper comprises a rubberized ply having a plurality of substantially parallel flipper reinforcing members spaced apart in the circumferential direction in the range of nine to twenty-five flipper reinforcing members per inch in a direction transverse to the longitudinal extent of said flipper reinforcing members.

10. The tire set forth in claim 9 wherein said rubberized ply has a modulus of elasticity in a direction parallel to the longitudinal extent of said flipper reinforcing members of at least 100 megaPascals at an elongation resulting from ten percent unit strain.

11. The tire set forth in claim 8 wherein each of said flipper reinforcing members is disposed at an angle relative to a radial plane in the range of 30 degrees to 60 degrees, said flipper reinforcing members in a leg portion on one axial side of said bead extend in a direction with respect to said radial plane opposite to said flipper reinforcing members in another leg portion on the other axial side of said bead extend with respect to said radial plane.

12. The tire set forth in claim 4 further including a respective axial end portion of said carcass ply extending radially outward of said bead reference a distance which is less than the extent of an axially outermost leg portion of said flipper.

13. The tire set forth in claim 1 wherein said flippers have short fibers of textile or metallic material aligned in a predetermined direction to reinforce a rubber matrix and form a composite ply for each one of said flippers.

* * * * *